(12) United States Patent
Hindle et al.

(10) Patent No.: US 7,930,269 B2
(45) Date of Patent: Apr. 19, 2011

(54) SYNCHRONIZING DATA IN A DISTRIBUTED DATA PROCESSING SYSTEM

(75) Inventors: Guy Patrick Hindle, Southampton (GB); Lawrence Leon Porter, Lyndhurst (GB); Richard Thomas Smith, Farnborough (GB); Graham Derek Wallis, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 10/537,213

(22) PCT Filed: Apr. 8, 2003

(86) PCT No.: PCT/GB03/01504
§ 371 (c)(1),
(2), (4) Date: Jun. 2, 2005

(87) PCT Pub. No.: WO2004/051472
PCT Pub. Date: Jun. 17, 2004

(65) Prior Publication Data
US 2006/0026006 A1 Feb. 2, 2006

(30) Foreign Application Priority Data
Dec. 4, 2002 (GB) .................................. 0228279.6

(51) Int. Cl.
*G06F 17/00* (2006.01)
(52) U.S. Cl. ........ 707/610; 707/612; 707/616; 707/617; 707/620
(58) Field of Classification Search .................. 707/610, 707/612, 616, 617, 620
See application file for complete search history.

(56) References Cited

U.S. PATENT DOCUMENTS

| 6,023,684 A | 2/2000 | Pearson |
| 6,546,437 B1 * | 4/2003 | Grimsrud .......................... 710/8 |
| 6,950,848 B1 * | 9/2005 | Yousefi'zadeh .............. 709/203 |
| 7,136,881 B2 * | 11/2006 | Gehman et al. ....................... 1/1 |
| 2002/0169775 A1 | 11/2002 | Meng |

(Continued)

FOREIGN PATENT DOCUMENTS
JP 2001282594 10/2001

OTHER PUBLICATIONS

Frolund, Svend et al., "Implementing e-Transactions with Asynchronous Replication", Dependable Systems and Networks, 2000, Proceedings International Conference on New York, New York, Jun. 25, 2000, pp. 449-458.

(Continued)

*Primary Examiner* — Sana Al-Hashemi
(74) *Attorney, Agent, or Firm* — Stephen R. Tkacs; Stephen J. Walder, Jr.; David A. Mims, Jr.

(57) ABSTRACT

A method of synchronization for use in a distributed data processing system comprising a legacy computer having means for storing a master version of data, an application server, and a thin client computer which stores a copy of the master version of data. Firstly, the thin client executes operations locally on the copy. The operations are sent in a list to the application server. The application server executes the operations on the master data, on behalf of the thin client. If the operations can be executed successfully on the master version, synchronization occurs in that the successful operations are applied to the master version.

13 Claims, 6 Drawing Sheets

U.S. PATENT DOCUMENTS

| | | |
|---|---|---|
| 2002/0178223 A1 | 11/2002 | Bushkin |
| 2003/0046266 A1 | 3/2003 | Mullins et al. |
| 2003/0154191 A1 | 8/2003 | Fish et al. |
| 2003/0212578 A1 | 11/2003 | Link et al. |
| 2004/0153445 A1 | 8/2004 | Horvitz et al. |
| 2006/0173906 A1 | 8/2006 | Chu et al. |
| 2009/0118845 A1 | 5/2009 | Eldridge et al. |

OTHER PUBLICATIONS

Vogler, Hartmut et al., "The Transaction Internet Protocol in Practice: Reliability for WWW Applications", Internet Workshop, 1999, IWS 99, Piscataway, New Jersey, Feb. 18, 1999, pp. 189-194.

USPTO U.S. Appl. No. 11/858,175; Image File Wrapper printed, Dec. 7, 2010, 3 pages.

* cited by examiner

FIG. 6

Mr. J. Bloggs Bank Account Data

Previous Bank Balance = £100

Operation 1 = success    Bank Balance = £150

Operation 2 = success    Bank Balance = £50

Operation 3 = failed

Current Bank Balance = £50

600

SYNCHRONIZING DATA IN A DISTRIBUTED DATA PROCESSING SYSTEM

FIELD OF THE INVENTION

The present invention relates to the field of synchronization and more particularly, to synchronization in an n-tier architecture.

BACKGROUND OF THE INVENTION

The Internet is changing many aspects of our lives, but no area is undergoing as rapid and significant a change as the way businesses operate. For businesses today, Internet technology is no longer an afterthought in forming a business strategy but has become a driving force. e-business is defined by many organizations as the transformation of key business processes through the use of Internet technologies. An e-business connects critical business systems directly to customers, employees, suppliers, and distributors via the Internet to improve time to market, access a broader base of customers and suppliers, improve efficiency, and reduce costs.

Examples of companies implementing an e-business model include retailers offering online purchasing integrated with online supply chain management or electronic financial service organizations that reduce the high cost of transactions while providing improved access to customer accounts. e-business has progressed from being a means of automating certain business functions to become an essential element of competitive business.

A framework is a reusable design expressed as a set of abstract patterns and the way their interfaces collaborate. It is a reusable design for all or part of a software system; a user interface framework only provides a design for the user interface of a system while an application framework provides a design for the entire application.

Application frameworks are becoming increasingly important for developing complex applications. An application framework describes a set of interacting components and services available to an application, the responsibilities of and the interactions between the components and services. A developer creates an application by composing and extending the components and services available in the application framework. Application frameworks typically address specific business domains, such as manufacturing or finance.

Early frameworks revolved around programming languages, such as an object-oriented (OO) design framework. Application frameworks do not have to be implemented in an object-oriented language, but they do have characteristics similar to OO design in that each component of the framework has defined interfaces and behaviour. An application framework provides a context for the software, servers, and services necessary to create, deploy, and manage complex e-business applications.

The application framework used by International Business Machines Corporation for e-business provides a model for designing e-business solutions. This model has evolved from the traditional client/server computing model and is based on an "n-tier" distributed environment where tiers of application logic and business services are constructed from components that communicate with each other across a network.

In its most basic form, the framework can be depicted as a logical three-tier computing model meaning that there is a logical, but not necessarily physical, separation of processes. With reference to FIG. 1, there is shown an example of a three-tier model (100) comprising a client tier (105), a middle tier (110; and a third tier (115).

The client tier (105) comprises clients (e.g. smartcards, digital wireless telephones, personal digital assistants (PDAs)) having logic related to sending requests to applications (e.g. through a browser or Java applet) and to presenting information and results produced by an application to the user (via a graphical user interface). The clients are sometimes referred to as "thin" clients, meaning that little or no application logic is executed on the client and therefore relatively little software is required to be installed on the client. Typically, only user interaction and input validation functions run on the client. Clients are implemented with industry-standard technologies and protocols (e.g. TCP/IP, HTTP, HTML/DHTML/XML, and Java (Java and all Java-based trademarks are trademarks of Sun Microsystems, Inc. in the United States, other countries, or both)) that enable them to interact with the user, communicate with a middle tier and send and receive standard data formats.

The use of thin clients improves manageability, flexibility, and time to market. Advantageously, a broader range of client devices can be supported since the dependency on device capabilities are reduced.

Furthermore, user's application environments can be centrally managed and distributed to client devices of different types and in different locations to provide support for mobile users.

The middle tier (110) comprises application servers, which are single application or multi-application servers. In an e-business environment, the servers are web application servers that are optimized for Internet applications. The application servers are the platforms that provide the run-time environment for an application's business logic. The business logic is executed independently of the client type and user interface style. The separation of presentation logic from the application logic enables the creation of reusable application components that can be used from a number of different styles of user interface.

The middle tier servers incorporate several application integration technologies for communicating with applications, data, and services in other tiers. Web application transaction servers are essential in the e-business infrastructure because the number of online transactions is increasing tremendously. Customers need high-speed transaction processing, robust system reliability, backup and quick recovery of mission-critical applications. Web application servers must also provide a comprehensive integration capability with other systems. They must also connect with each other as well as the back-end third tier to enable these new business processes.

The web application servers are implemented using various Internet and Java technologies, including the HTTP server and the platform independent Enterprise Java programming environment. The latter eliminates the dependence of the business logic on the underlying hardware, operating system and networking infrastructure, thus increasing portability and decreasing development and maintenance costs. The middle tier incorporates the network infrastructure and foundation services that enable rapid development and deployment of applications in a distributed network environment. Applications (120) run as a combination of servlets, server-side scripts, and Enterprise JavaBeans (EJBs) in the web application server and its Java Virtual Machine. EJBs provide much of the business logic of an application, particularly access to database and transaction services. EJBs isolate the developer from the unique characteristics of the underlying database and transaction services, simplifying the development of platform independent business logic.

The third tier (115) comprises legacy systems that have been used for many years (hence the term "legacy") that support new and existing internal applications, services and data; and also external applications, services and data from new and existing business partners. Connections to these services leverage value for customers, business partners and employees. External services and legacy systems are fundamental to the emergence of the web application model because they are the result of years of corporate investment in information technology. These are the mission-critical applications and data that everyone depends on daily, and they are the business assets that need to be made available to the Web in a secure, controlled way to enable companies to leverage their value for customers, employees, and suppliers in intranets and extranets. The servers in this tier provide the data storage and transactional applications used by the web application server processes.

Application elements residing in these three logical tiers are connected through a set of industry-standard protocols, services, and software connectors. The connectors (125, 126, 127) connect the new, value-add business logic in the middle tier to the vast accumulated assets in a company's existing applications and data systems in the back-end tier. The business logic running on the middle tier accepts a request (e.g. HTTP request) from the client and invokes a connector to securely communicate with the back-end tier services on the client's behalf.

An alternative model is the "data synchronization" model. With reference to the distributed system (200) of FIG. 2, an application resides on a server (215) (e.g. in storage (220)) and a replica of the same application resides on a "fat client" (e.g. a personal computer) (205) (e.g. in storage (210)). The fat client executes most or all of the processing of applications itself. When a user is offline, they can work locally on the replica data and at intervals, the user connects to the server (215), via a network (225) and the replica data is synchronized with the master data residing on the server (215). This model is often used for Personal Information Management (PIM) applications e.g. calendar, email etc and is particularly useful for mobile clients, which are only intermittently connected to the network.

Currently, many organizations would like to include data synchronization as a method to deliver e-business applications. For example, banks would like to provide customers with the ability to view and manipulate their accounts from a PDA application, with regular synchronization of the local data on the PDA with the master data on the back-end tier. However, the data synchronization model does not fit well with the e-business three-tier model. Specifically, organizations are unwilling or unable to synchronize their complex, highly protected back-end databases directly with the clients. Another complexity is that the business logic of applications running on a web application server, is driven by HTTP requests and produces HTTP responses. Synchronization protocols that are required between a client and the back-end tier are not understood by the business logic.

One possible solution is to extract a copy of the data from the back-end tier to the middle tier. The clients can then connect to the middle tier and update the data. The updated data can then be synchronized with the data stored on the back-end tier via the middle tier.

However, this solution has disadvantages. Firstly, the data that the client works on will always be out of date, especially if the data is extracted in an overnight batch. Furthermore, new application function must be developed to synchronize the updated data with the data on the back-end tier in order to maintain coherent data on the back-end tier. This in turn results in the need for distributed transaction processing, which has well-known drawbacks. For example, if a transaction coordinator "commits" a transaction (e.g. Bank A debits money from Account A and Bank B credits the money to Account B), to all resource managers that are participating in that transaction but then the network were to go down, the coherence of the state of the transaction can not be relied upon. Some of the resource managers would register the transaction as being completed, but some may not. Typically, the resource managers that require clarification on the outcome of the transaction need to contact the transaction coordinator. However, this is not possible until the network is live again and in the meantime, Accounts A and B could be locked for some time. Another disadvantage is that to scale the solution to several thin clients, the middle tier must typically comprise several web application servers. The problem of maintaining coherency therefore dramatically increases.

U.S. Pat. No. 6,023,684 discloses a three tier model, whereby at the initiation of a logical session with a client program, an application service refreshes data for a customer associated with the client program, by using data obtained from a back-end processing system through the host interface. The data is stored in local data memory associated with the application service and this data is then used by the application service for processing client requests during the logical session. The local data memory permits the processing of the client request to be decoupled from the updating of the back-end processing system.

Thus there is a need for a model that provides the benefits of the data synchronization model and the "n-tier" model, without the need for extensive change of the "n-tier" model.

SUMMARY OF THE INVENTION

In one illustrative embodiment, a method of synchronizing data in a distributed data processing system comprises storing a master data in at least one legacy computer system, enabling a first non-legacy computer to support synchronization, storing a copy of the master data in a second non-legacy computer, and executing, by the second non-legacy computer, at least one operation on the copy of the master data. The method further comprises sending, by the second non-legacy computer, the at least one operation to the first non-legacy computer and replaying, by the first non-legacy computer, the at least one operation. The method further comprises determining whether the at least one operation is successful and in response to a determination that the at least one operation is successful, synchronizing said master data by applying said at least one operation to form a modified copy of the master data.

In another illustrative embodiment, an apparatus is provided in a middle-tier computer. The apparatus comprises a processor and a memory coupled to the processor. The memory comprises instructions which, when executed by the processor, cause the processor to receive, via a first software connector, at least one operation from a thin client computer. The thin client computer stores a copy of master data from a legacy computer and executes the at least one operation on the copy of the master data. The instructions further cause the processor to sequentially replay the at least one operation on the master data at the legacy computer via a second software connector, determine whether the at least one operation is successful, and in response to a determination that the at least one operation is successful, synchronize the master data by applying the at least one operation via the second software connector to form new master data at the legacy computer, such that in response to a determination that the at least one operation is not successful, the middle-tier computer does not synchronize the master data.

In yet another illustrative embodiment, a computer program product comprises a computer recordable medium having a computer readable program recorded thereon. The computer readable program, when executed on a middle tier computer, causes the middle tier computer to receive, via a first software connector, at least one operation from a thin client computer. The thin client computer stores a copy of master data from a legacy computer and executes the at least one operation on the copy of the master data. The computer readable program further causes the computing device to sequentially replay the at least one operation on the master data at the legacy computer via a second software connector, determine whether the at least one operation is successful, and in response to a determination that the at least one operation is successful, synchronize the master data by applying the at least one operation via the second software connector to form new master data at the legacy computer, such that in response to a determination that the at least one operation is not successful, the middle-tier computer does not synchronize the master data.

These and other features of the illustrative embodiments will be described in, or will become apparent to those of ordinary skill in the art in view of, the following detailed description of the example embodiments of the present invention.

BRIEF DESCRIPTION OF THE DRAWINGS

The present invention will now be described, by way of example only, with reference to preferred embodiments thereof, as illustrated in the following drawings:

FIG. 6 is a representation of the results of data synchronization.

DETAILED DESCRIPTION OF THE INVENTION

Figure 1:
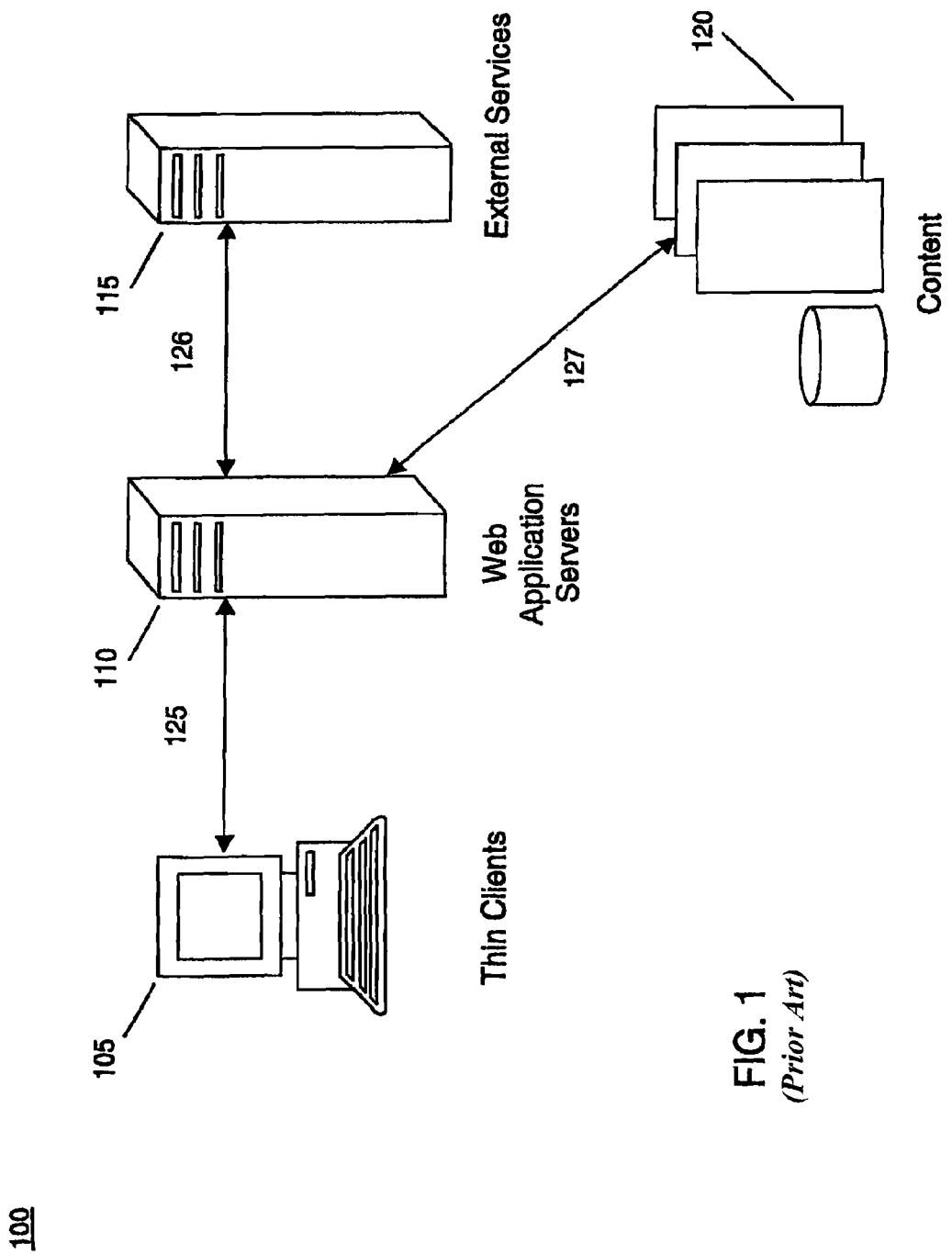
FIG. 1 is a schematic representation of a prior art "n-tier" model.
Figure 2:
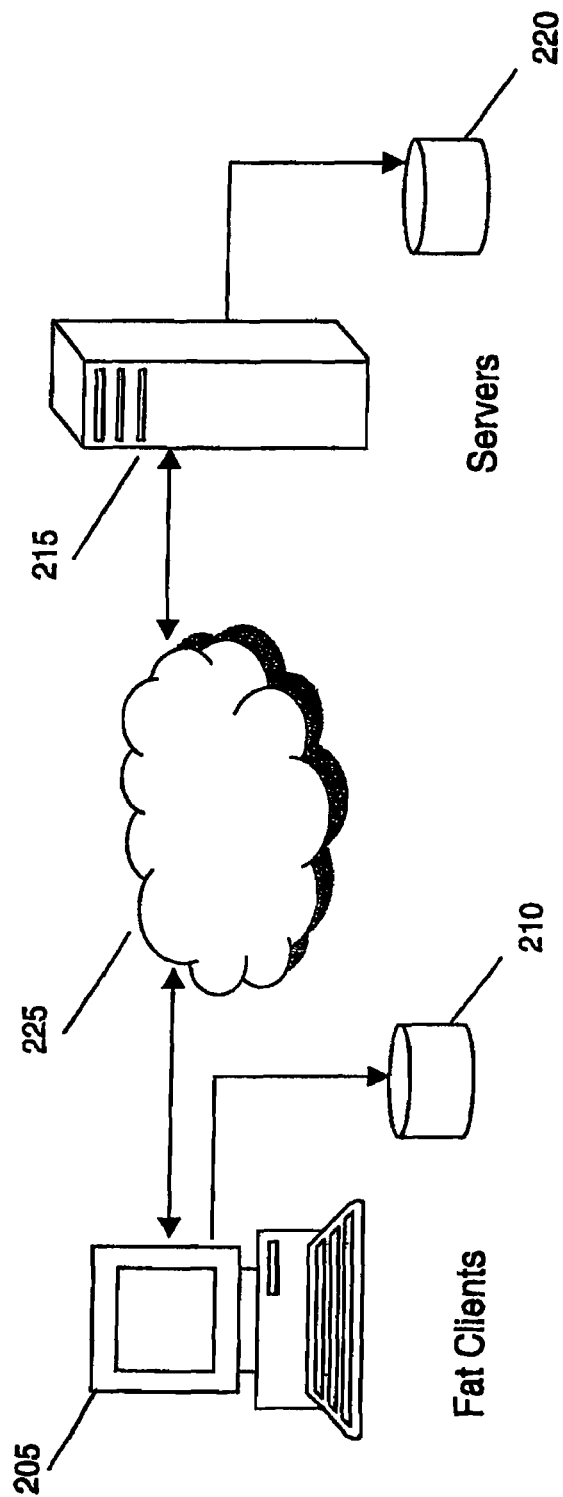
FIG. 2 is a schematic representation of a prior art data synchronization model.
Figure 3:
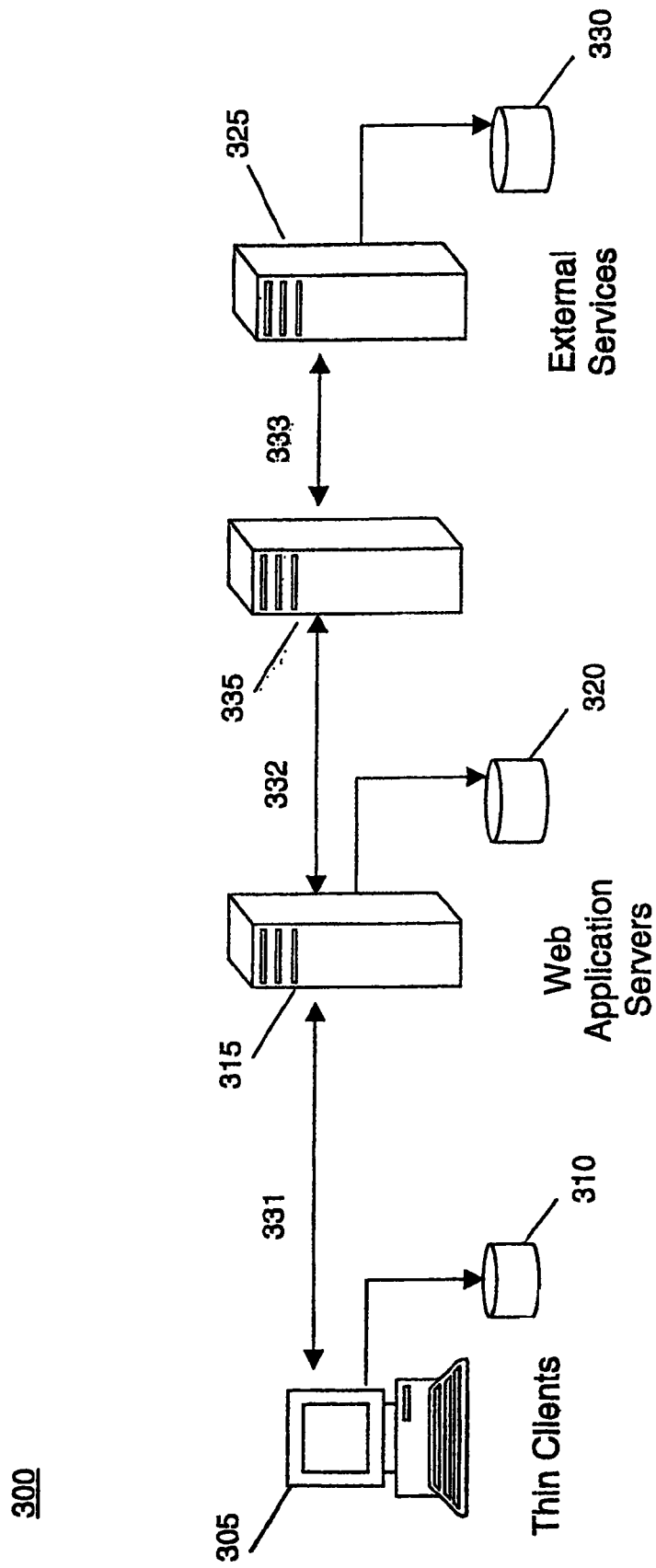
FIG. 3 is a schematic representation of an "n-tier" model, in accordance with the present invention.

FIG. 3 shows a pictorial representation of a three-tier model (300) in which the present invention may be implemented. There is shown a client tier (305), a middle tier (315) and a back-end tier (325) having associated storage means (310, 320 and 330 respectively). The client tier (305) and middle tier (315) are connected by a software connector (331) and the middle tier (315) and back-end tier (325) are connected by software connectors (332 and 333). The applications and services on the back-end tier (325) are protected by a firewall (335).

Figure 4:
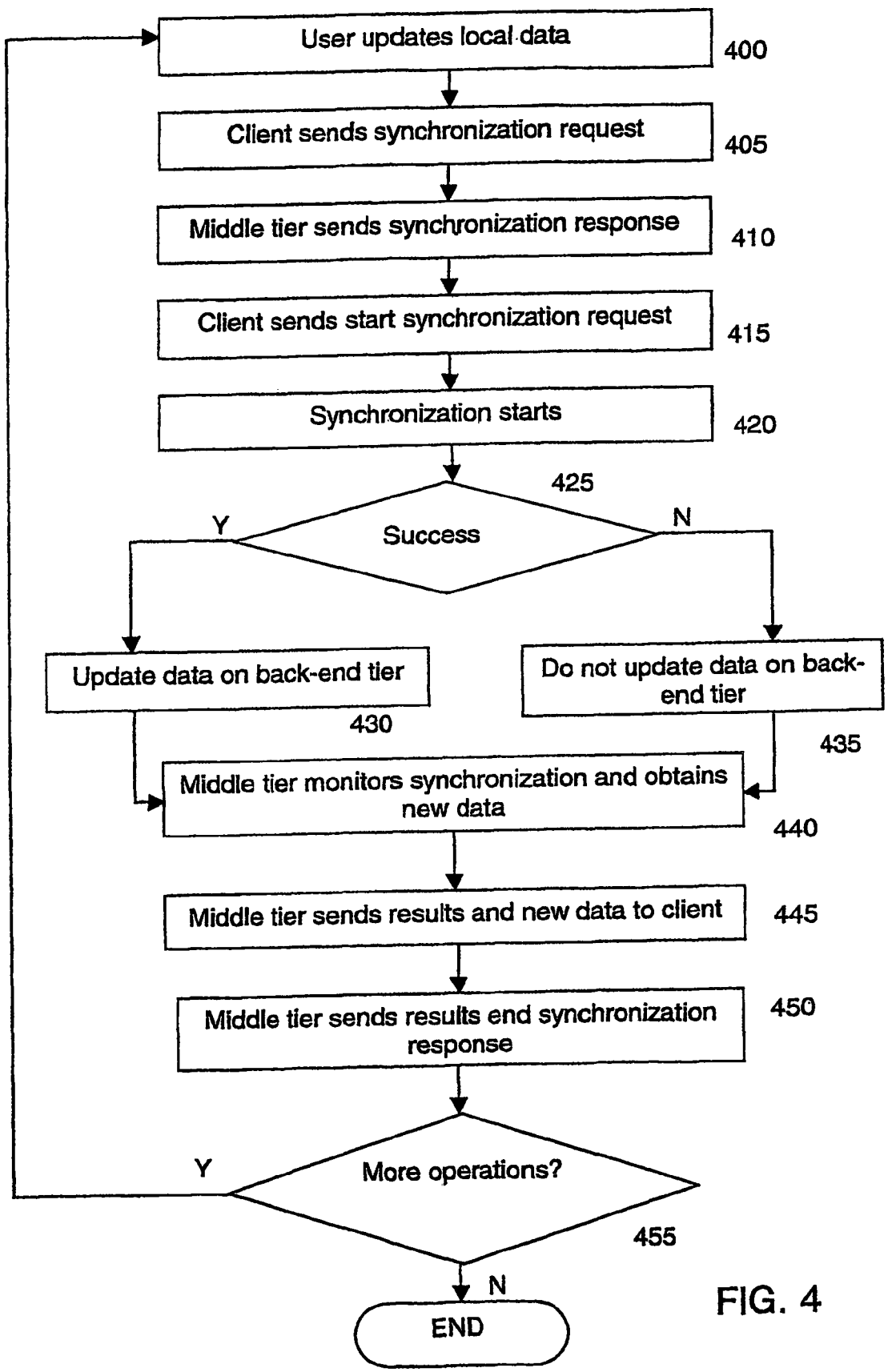
FIG. 4 is a flow chart showing the operational steps involved in a data synchronization process, implemented in the model as shown in FIG. 3.
Figure 5:
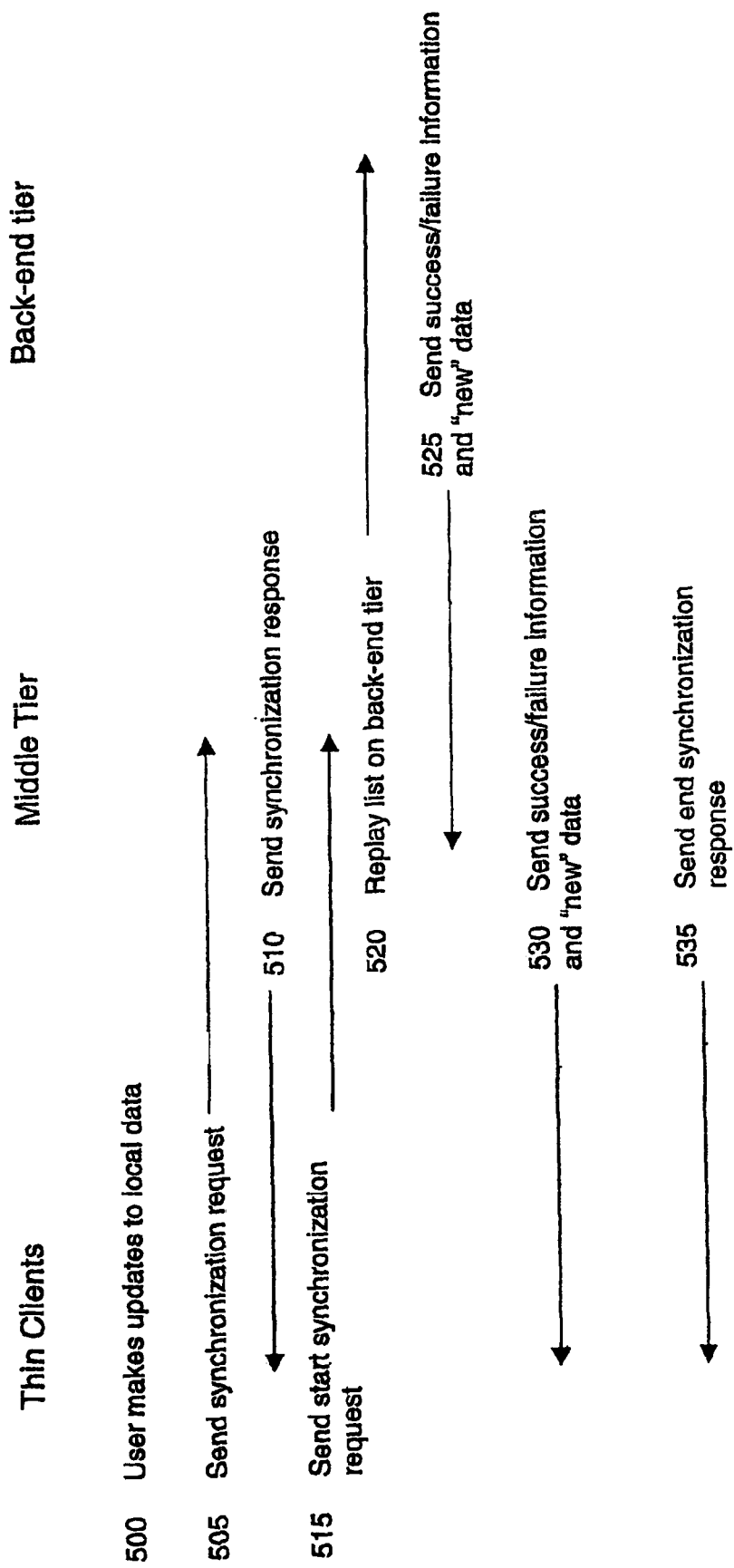
FIG. 5 is a sequence diagram of the flows involved in the data synchronization process between the components in the model as shown in FIG. 3.

One embodiment of the present invention will now be described with reference to FIGS. 3, 4 and 5. An example of a banking application is described, whereby the thin client (305) is a PDA, the middle tier (315) is a web application server and the back-end tier (325) is a data repository for storing master versions of bank account data.

Preferably, the thin client (305) comprises a function, which when executed, obtains a copy of a user's bank account data from the storage means (330) of the back-end tier (325). Preferably, the copy is stored locally in the storage means (310) associated with the thin client (305). In this example, bank account data with a balance of £300 is stored locally. The user executes (step 400, 500) operations (e.g. changes/updates) against the local data. In this embodiment, the operations are:
1) A monetary transfer of £50 into the account
2) Setting up a standing order of £100 out of the account
3) Making a one-off payment of £75 out of the account However, the local data is more than likely to be outdated with respect to the master version residing on the back-end tier (325). This is because some of the user-initiated operations may clash with concurrent operations being applied to the master version of the user's bank account at the back-end tier (325). For example, standing orders being paid, monetary transfers to savings accounts, mortgage payments, etc. In this embodiment, a concurrent operation has been applied to the master version of the user's bank account. In this example a one-off payment of £200 has been taken out of the user's bank account and therefore, the actual balance stands at £100 (i.e. £300−£200=£100).

Since the operations initiated by the user have not yet been reconciled with any concurrent operations that have been applied to the master version, preferably, the user's operations are retained in a list. The thin client (305) therefore stores two types of data, namely, a copy of the "current" (possibly slightly divergent from the master version) data (i.e. the user's bank account data) and a list of pending operations (i.e. a list of operations 1, 2 and 3 above).

Next, the user at the thin client (305) sends (step 405, 505) a request (Request A) to synchronize the updated local data with the master version via an HTTP request to the middle tier (315). The middle tier (315) acknowledges receipt of "Request A" by sending (step 410, 510) back an HTTP response (Response A') instructing the thin client (305) to proceed with synchronization. It should be understood that this request/response exchange is an optional stage. Next, the user at the thin client (305) sends (step 415, 515) an HTTP request (Request B) to the middle tier (315) in order to start synchronization. The thin client's standard synchronization protocol is also sent to the middle tier (315). Advantageously, in addition to exploiting the business application logic on the middle tier by using the HTTP request/response model, the functions of the middle tier, which can run native thin-client synchronization protocol(s), are also exploited.

The synchronization process now starts (step 420). Specifically, the data to be synchronized is the list of operations (1, 2 and 3 above) that the user at the thin client (305) would like to perform. In the synchronization step, the list of operations is loaded from the thin client (305) to the middle tier (315). The middle tier (315) then replays (520) the operations in the list on the back-end tier (325); that is, a monetary transfer of £50 is made into the account, a standing order of £100 out of the account is set up and a one-off payment of £75 is made out of the account. It should be understood that preferably, the replaying step occurs promptly, so that the chances of conflicts are decreased. Also, preferably, the list of operations is replayed sequentially.

It should be understood that some of the user-initiated operations may succeed and some of them may fail, depending on whether any conflicting concurrent operations have been applied to the master version residing on the back-end tier (325). If concurrent operations have been applied to the master version, these would have been applied after the thin client (305) had received a "current" copy of the data. At step 425, for each operation, a determination is made as to whether it is successful or not. In response to a positive result, the master version of the data is synchronized (step 430) to reflect the successful user-initiated operations and in response to a negative result, the master version of the data is not synchronized (step 435). In this example, the actual bank account balance stands at £100. Therefore, operation 1 succeeds (after which, the actual bank account balance=£150), operation 2 succeeds (after which, the actual bank account balance=£50) and operation 3 fails (because the actual bank account balance would=£25).

Next, the back-end tier (325) sends (525) the results of the user-initiated operations to the middle tier (315) as well as a copy of the new (updated) master version of the bank account (in this example, the actual bank account balance=£50).

The middle tier (315) monitors (step 440) the results of these operations and sends (step 445, 530) the results and also the copy of the new master version of the bank account to the thin client (305). The new master version of the bank account replaces the local copy that was used by the user in step 400.

The synchronization process has now ended and this is indicated to the user by sending (step 450, 535) an HTTP response (Response B') from the middle tier (315) to the thin client (305). Preferably, the user can then be presented with an updated view of the state of the bank account, a list of the successful operations and a list of failed operations. An example of the view (600) is shown in FIG. 6. At step 455, if no further operations are to be carried out, the process ends. However, in response to a positive result, processing returns to step 400 where, for example, a user can act upon the failed operations by canceling them, modifying them, deferring them etc.

Advantageously the middle tier only needs to access the master version of the data after synchronization has occurred, in order to send the thin client an up-to-date copy of the new master version of the data. Furthermore, the preferred embodiment accommodates the possibility that concurrent operations might have been applied to the master version of the data. This scenario is handled without the need for consistent copies of the data at the thin client and the back-end tier.

Another advantage is that the benefits of a data synchronization model are provided without the need to extensively change the three-tier model. Therefore, the present invention can be utilized in systems that are already supported by many organizations today. For example, the existing relationship between the thin client and middle tier can be used, namely, the currently available HTTP and PDA-synchronization protocols. However, it should be understood that the present invention could be implemented with other protocols. Furthermore, although a three-tier model has been described, the present invention could be implemented in a model with "n" tiers. Also, although a PDA, web application server and back-end host have been described, it should be understood that the tiers could comprise any other computer machine.

The invention claimed is:

1. A method of synchronizing data in a distributed data processing system comprising:
storing a master data in at least one legacy computer system;
enabling a first non-legacy computer to support synchronization;
storing a copy of the master data in a second non-legacy computer;
executing, by said second non-legacy computer, at least one operation on said copy of the master data;
sending, by said second non-legacy computer, said at least one operation to said first non-legacy computer;
replaying, by said first non-legacy computer, said at least one operation;
determining whether the at least one operation is successful; and
in response to a determination that the at least one operation is successful, synchronizing said master data by applying said at least one operation to form a modified copy of the master data.

2. The method in claim 1, further comprising sending, by the second non-legacy computer, a synchronization protocol to the first non-legacy computer.

3. The method in claim 1, wherein said at least one operation further comprises at least two operations which are replayed by said first non-legacy computer sequentially.

4. The method in claim 1, wherein the replaying, by said first non-legacy computer further comprises:
sending by said first non-legacy computer the results from said at least one operation, to said second non-legacy computer; and
sending by said first non-legacy computer the modified copy of the master data, to said second non-legacy computer.

5. The method in claim 1, further comprises:
responsive to a determination that the at least one operation is not successful, not synchronizing the master data.

6. An apparatus in a middle-tier computer, comprising:
a processor; and
a memory coupled to the processor, wherein the memory comprises instructions which, when executed by the processor, cause the processor to:
receive, via a first software connector, at least one operation from a thin client computer, wherein the thin client computer stores a copy of master data from a legacy computer and executes the at least one operation on the copy of the master data;
sequentially replay the at least one operation on the master data at the legacy computer via a second software connector;
determine whether the at least one operation is successful; and
in response to a determination that the at least one operation is successful, synchronize the master data by applying the at least one operation via the second software connector to form new master data at the legacy computer, such that in response to a determination that the at least one operation is not successful, the middle-tier computer does not synchronize the master data.

7. The apparatus in claim 6, wherein instructions further cause the processor to:
receive a synchronization protocol from the thin client computer via the first software connector.

8. The apparatus in claim 6, wherein the at least one operation further comprises at least two operations that are replayed by the middle-tier computer sequentially.

9. The apparatus in claim 6, wherein replaying the at least one operation on the master data at the legacy computer further comprises:
sending the results from the at least one operation to the thin client computer via the first software connector; and
sending the new master data to the thin client computer via the first software connector.

10. A computer program product comprising a computer recordable medium having a computer readable program recorded thereon, wherein the computer readable program, when executed on a middle tier computer, causes the middle tier computer to:
- receive, via a first software connector, at least one operation from a thin client computer, wherein the thin client computer stores a copy of master data from a legacy computer and executes the at least one operation on the copy of the master data;
- sequentially replay the at least one operation on the master data at the legacy computer via a second software connector;
- determine whether the at least one operation is successful; and
- in response to a determination that the at least one operation is successful, synchronize the master data by applying the at least one operation via the second software connector to form new master data at the legacy computer, such that in response to a determination that the at least one operation is not successful, the middle-tier computer does not synchronize the master data.

11. The computer program product in claim 10, wherein the computer readable program further causes the middle tier computer to:
- receive a synchronization protocol from the thin client computer via the first software connector.

12. The computer program product in claim 10, wherein the at least one operation further comprises at least two operations that are replayed by the middle-tier computer sequentially.

13. The computer program product in claim 10, wherein replaying the at least one operation on the master data at the legacy computer further comprises:
- sending the results from the at least one operation to the thin client computer via the first software connector; and
- sending the new master data to the thin client computer via the first software connector.

* * * * *